INVENTOR.
Adolph Goodman

Patented Nov. 30, 1943

2,335,753

UNITED STATES PATENT OFFICE 2,335,753

OVER-AND-UNDER SCALE

Adolph Goodman, Brooklyn, N. Y.

Application January 11, 1943, Serial No. 472,062

8 Claims. (Cl. 265—59)

The present invention is directed to scales for the weighing of certain products, and particularly, to the type of scale involving two balanced plates or platforms and a pointer for indicating the balance of weights on said plates, and commonly termed an over-and-under scale.

Scales of this type are quite well known and are in extensive use. They are used to a large extent where it is desired to weigh out the same amount of materials or goods in packages and in large numbers. Because of this, it is highly desirable that the scale be quick-acting in order that a minimum of time may be consumed in completing each weighing. However, because the platforms are delicately balanced, upon the placing of weights thereon the pointer oscillates for a considerable period of time before it slows down sufficiently so that the operator becomes certain that the proper weight has been measured.

To overcome such difficulties, various proposals have been made for the modification of the structure in order to speed up the movement of the pointer and to cause it to come to a stop at an earlier point in the oscillations. Among the devices previously proposed was one which involved the employment of a series of links interconnecting various of the moving elements of the scale. However, such structures become complicated and require complete re-designing of the scales and they are not particularly effective in obtaining the desired results.

In another proposed construction a pair of coil springs was attached to the base of the pointer and to the lever or beam of the scale. While this had some effect in the stopping of the pointer at an earlier time, it was not completely effective and it was subject to variations in use. If the springs were not exactly of the same character, length, size and tension, the movement of the pointer was inaccurate. Also, in use, if a slight variation occurred, the inaccuracy of the device became quite apparent.

In practically all of the devices of the prior art the movement of the parts was relatively great, placing a considerable strain on the knife edges which support the moving parts. Because of such large movements, considerable friction was induced and the knife edges wore away rather rapidly, introducing inaccuracies in the scale after even a short period of use. Also in such devices the pointer moved over the scale a relatively short distance in response to a relatively large weight. This meant that the scale was not sufficiently sensitive and made it more difficult for the operator to accurately weigh material or article.

The present invention is intended and adapted to overcome the above mentioned difficulties and disadvantages and to provide a scale structure which is simple and compact and which is highly accurate in its functioning.

It is also among the objects of the present invention to provide a scale structure in which the pointer moves a relatively great distance for small changes in weight on the platforms, whereby a highly sensitive and accurate scale is produced.

It is further among the objects of the present invention to provide a structure of scale in which the movements of the platforms are relatively short and thereby the strain placed on the knife edges and other parts thereof due to the manipulation of weights is minimized and wear is largely eliminated.

It is still further among the objects of the present invention to provide a structure wherein the pointer is caused to come to rest after but a very few oscillations even though large weights are being handled by the scale, thereby greatly facilitating the operation thereof.

In practicing the present invention I provide a scale having the usual lever or beam and a pair of platforms suitably balanced thereon. The usual pointer attached to the scale indicates the zero point and variations above and below the weight to be measured. The invention contemplates the provision of a torsion made, usually, of highly tempered blue ribbon, said torsion being placed just below each of the platform supports and secured thereto. The pointer is connected into the system by a special device which may be called a speed check, which is suitably balanced so that the pointer becomes highly sensitive and functions very rapidly. There is a straight pull on the torsions and they do not twist.

The invention is more fully explained in conjunction with the accompanying drawings constituting a part hereof and in which like reference characters indicate like parts, and in which.

Figure 1:
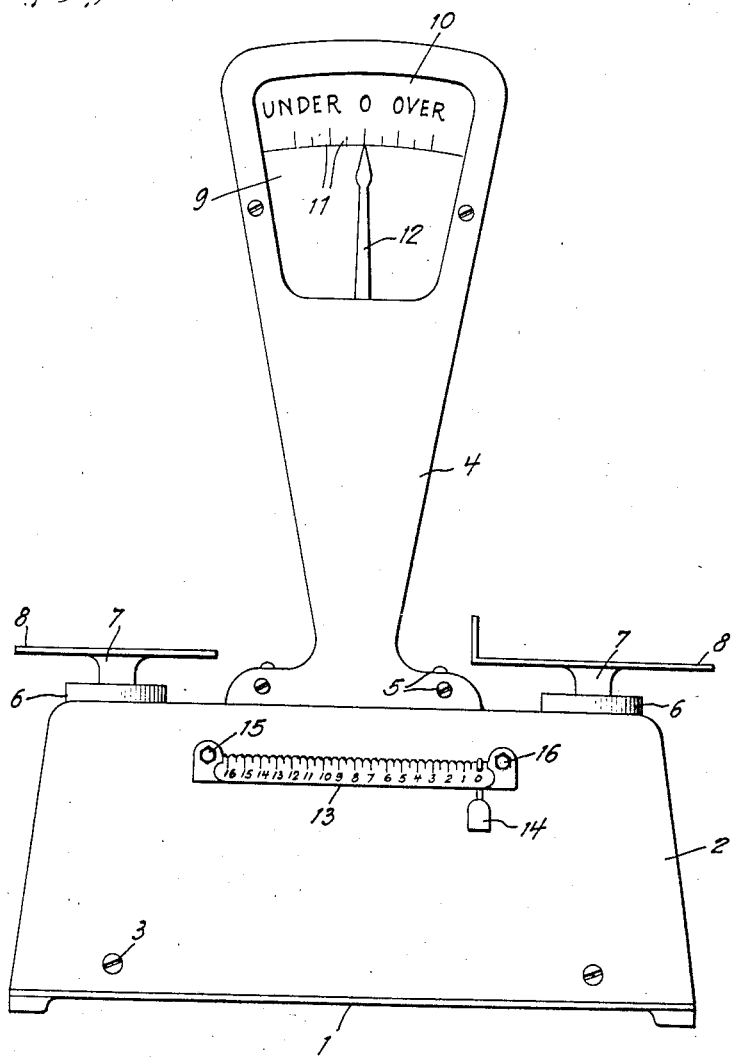
Fig. 1 is a front elevational view of a scale made in accordance with the present invention.
Figure 2:
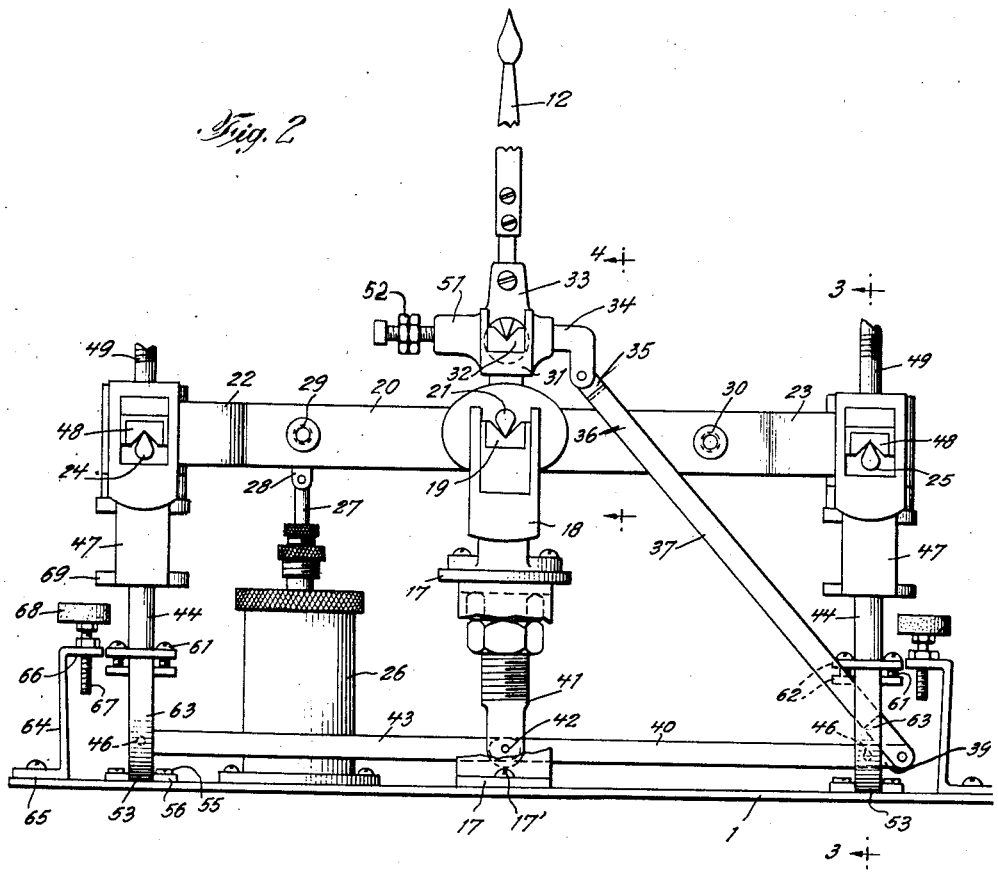
Fig. 2 is a front elevational view of the scale with the cover or housing and platforms removed and some parts being broken away for clearness.
Figure 3:
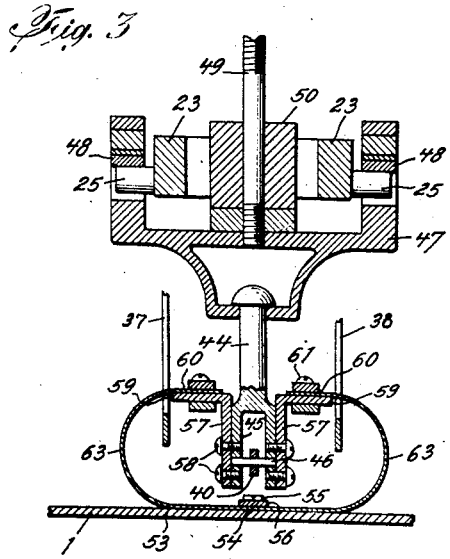
Fig. 3 is a transverse cross-sectional view thereof taken along the line 3—3 of Fig. 2.
Figure 4:
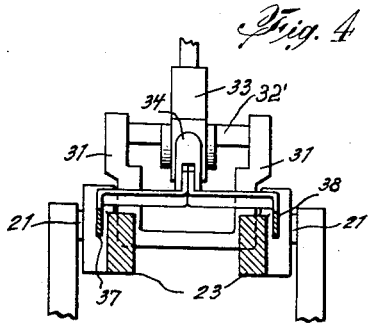
Fig. 4 is a transverse cross-sectional view thereof taken along the line 4—4 of Fig. 2.

There is provided a base 1 having a housing or cover 2 secured thereto by screws 3. Extending upwardly from the center thereof is an additional housing 4 held to cover 2 by screws 5. Openings 6 on the two sides of housing 4 are adapted to receive the bosses 7 of platforms 8, said bosses being connected with the internal mechanism of the scale. At the upper end of housing 4 is an opening 9 having a scale 10 therein and a pointer 12 moving over the graduations 11 on said scale. A graduated bar 13 has a movable weight 14 thereon, as is usual in scales of this type. The bar is secured to the mechanism by bolts 15 and 16 at the end thereof passing through openings (not shown) in cover 2.

A lever support 17 is secured centrally to base 1 by suitable screws 17'. Extending upwardly therefrom is a yoke 18 having a pair of arms each of which holds a knife bearing 19. Horizontal beam 20 has a pair of knife edges 21 integral therewith fitting into bearings 19. The outer ends of lever or beam 20 are formed into yokes 22 and 23, each of the arms of yoke 22 having a knife edge 24 and, similarly, the arms 23 are each provided with a knife edge 25.

A dash-pot 26 is provided with a suitable liquid and a piston therein, as usual, the rod 27 thereof being secured to member 28 which, in turn, is fastened to lever 20. This, as usual, tends to slow down the movements of the lever 20. Threaded openings 29 and 30 are provided in the beam for the reception of bolts 15 and 16, respectively, whereby the position of weight 14 will affect the operation of the beam.

A pointer base 31 carried by the scale frame is provided with a pair of knife bearings 32. Knife edge 32' operates in bearings 32 and carries an upwardly extending portion 33 to which pointer 12 is secured. Extending laterally from portion 33 is a fork 34 in which is pivoted one end 35 of speed check or control arm 36, the opposite end thereof being pivoted at 39 in check arm 40, pivot 39 being at the extreme outer end of arm 40. Speed check 36 is made of two bars 37 and 38, joined together at the ends and forming a yoke which passes around lever 20. Means may be provided whereby adjustment may be made of the effective length of check 36 in order to properly position the pointer 12.

Fork 41 extends downwardly from lever support 17 and holds one end of arm 40 by means of pin 42. On the opposite side thereof is a similar check arm 43, one end of which is pivoted at 42.

Platform supports 44 below the ends of lever 20 are provided with forks 45 holding pins 46 which act as pivots for the outer ends of arms 40 and 43. Secured to the top of platform supports 44 are yokes 47 having knife bearings 48 secured thereto and adapted to cooperate with knife edges 24 and 25 on beam 20. Threaded rods 49 secured to supports 47 project upwardly through openings 6 and platforms 8 are threaded on the upper ends thereof. Weights 50 are provided around rods 49, as usual.

On extension 33 opposite to fork 34 is an extension 51 carrying adjustable back balance 52. The character of elements 51 and 52 is such that the weight balances the weight of speed check 36 and its associated parts.

Below each of the supports 44 is a thin flat torsion 53, usually of spring steel, the center 54 thereof being secured to base 1 by screws 55 passing through plates 56 resting on torsions 53. On either side of each of forks 45 is an L-shaped member 57 secured thereto by screws 58. The horizontal arms 59 thereof are adapted to receive the ends 60 of torsions or flat springs 53 and screws 61 passing through plates 62 are adapted to firmly hold such torsions in position. This forms loops 63 on opposite sides of supports 44. If it is desired to adjust the amount of tension and the size of loops 63, screws 61 are loosened and ends 60 are moved inwardly or outwardly a desired amount to give the adjustment, and screws 61 are then tightened.

At each of the ends of the scale is a Z-shaped plate 64, one of the legs 65 of which is secured to base 1 and the upper horizontal leg 66 is threaded to receive a screw 67. The head of the screw bears a resilient bumper 68 adapted to make contact with projection 69 on yoke 47. The position of the bumper is such as to limit the movement of beam 20.

The operation of the scale is conducted as usual, the essential difference being that the pointer 12 comes to a complete stop after a very few oscillations, whereby a quick weighing is obtained. Because the knife support or pivot of the pointer is relatively low and the pointer is relatively long, there is a wide swing due to a small amount of weight. Whereas previously a travel of one inch on the scale usually indicated a weight of one ounce, by reason of the present construction a similar amount of travel indicates a weight of one-fourth of an ounce, or even less. Therefore, the operator may much more quickly obtain the desired weight with a minimum of effort and time.

Because of the arrangement of the torsions and the speed check, the pointer stops very quickly. Whereas in prior constructions the beam travelled from three-fourths of an inch to an inch or more, in the present construction the travel is only three-sixteenths of an inch, or even less. Therefore, the final reading may be obtained very quickly. Because of the short travel and the quick stopping of the pointer, the strain on each of the knife edges has been greatly reduced and wear has been to a large extent eliminated. Therefore, the scale is not only more accurate when new, but it retains its accuracy for a longer time in service.

There are other advantages inherent in the present construction, as for instance, temperature variations do not affect the operation of the scale, as they are automatically compensated for by the character and positions of the torsion members. By providing the angularly placed speed check 36, the wide travel of the pointer is obtained. Because of the construction, the scale is relatively narrow opposite the platforms, which allows bulky materials to be readily weighed without interference.

While I have described my invention, setting forth a single embodiment thereof, it will be apparent to those skilled in the art that various changes in the details of construction may be made within the scope of the invention. For instance, the bar 13 and its associated parts may be omitted without impairing the functioning of the scale. The arrangement of parts may be changed in a number of respects, as for instance, the pointer 12 and its associated mechanism need not necessarily be at the center of the beam, but may be at the end or at some intermeiate position on the scale. The sizes and dimensions of various parts may also be altered. For instance, torsion 53 may be made of various lengths, widths and thicknesses and of various materials, depending upon the capacity of the scale, and the adjustability and variations of tensions thus provided may be utilized to give any desired swing of the pointer. By this arrangement a sensitivity of 0.01 of an ounce is obtainable on the scale. The scale will function perfectly even if it is not on a level place. The mechanical arrangements may also be varied at will, as for instance, the manner in which the torsions are secured to the forks may be changed in many different ways, depending upon the desires of the designer. The cover may be altered, it being used to prevent the entrance of dust. The number of parts introduced by the invention is small, whereby friction is minimized and the scale operates freely. Fork 34 may extend horizontally from the base 31. Check arm 36 may be made adjustable in length by suitable means.

From the above it will be apparent that within the principles as set forth herein, various types of scales and various details of construction may be changed to a great extent, and such constructions will still embody the present invention. Therefore, the invention is to be broadly construed and not to be limited except by the character of the claims appended hereto.

What I claim is:

1. A scale comprising a base, a horizontal lever beam pivoted centrally on said base, platform supports pivotally secured to the free ends of said lever, platforms on said supports, a check bar having its center pivoted to said base and having its ends pivoted to the lower ends of said supports, a weight indicator pivotally mounted on said base and operatively connected to said supports, a flat spring centrally secured to said base below each of said supports, the ends of each said spring being looped and being secured to its support, each spring providing a pair of loops on opposite sides of its support to exert balanced pressure on said support.

2. A scale comprising a base, a horizontal lever beam pivoted centrally on said base, platform supports pivotally secured to the free ends of said lever, platforms on said supports, a check bar having its center pivoted to said base and having its ends pivoted to the lower ends of said supports, a weight indicator pivotally mounted on said base and operatively connected to said supports, a flat spring centrally secured to said base below each of said supports, the ends of each said spring being looped and being secured to its support, and means for adjustably clamping the free ends of each spring to its support for adjusting the length of said springs to vary the damping effect thereof, each spring providing a pair of loops on opposite sides of its support to exert balanced pressure on said support.

3. A scale comprising a base, a horizontal lever beam pivoted centrally on said base, platform supports pivotally secured to the free ends of said lever, platforms on said supports, a check bar having its center pivoted to said base and having its ends pivoted to the lower ends of said supports, a weight indicator pivotally mounted on said base and operatively connected to said supports, a flat spring centrally secured to said base below each of said supports, the ends of each said spring extending laterally and being looped and being secured to its support at opposite sides thereof, each spring providing a pair of loops on opposite sides of its support to exert balanced pressure on said support.

4. A scale comprising a base, a horizontal lever beam pivoted centrally on said base, platform supports pivotally secured to the free ends of said lever, platforms on said supports, a check bar having its center pivoted to said base and having its ends pivoted to the lower ends of said supports, a weight indicator pivotally mounted on said base and operatively connected to said supports, said pivotal mounting being below the horizontal plane of said platforms and adjacent to the center of said beam, said indicator having one end of a control arm pivoted thereto, the other end of said arm being pivoted to said check bar adjacent an end thereof, said arm extending diagonally downward and outward from said indicator to said bar, a flat spring centrally secured to said base below each of said supports, the ends of each said spring being looped and being secured to its support, each spring providing a pair of loops on opposite sides of its support to exert balanced pressure on said support.

5. A scale comprising a base, a horizontal lever beam pivoted centrally on said base, platform supports pivotally secured to the free ends of said lever, platforms on said supports, a check bar having its center pivoted to said base and having its ends pivoted to the lower ends of said supports, a weight indicator pivotally mounted on said base and operatively connected to said supports, said pivotal mounting being below the horizontal plane of said platforms and adjacent to the center of said beam, said indicator having one end of a control arm pivoted thereto at a point approximately in horizontal alinement with the indicator mounting, the other end of said arm being pivoted to said check bar adjacent an end thereof, said arm extending diagonally downward and outward from said indicator to said bar, a flat spring centrally secured to said base below each of said supports, the ends of each said spring being looped and being secured to its support, each spring providing a pair of loops on opposite sides of its support to exert balanced pressure on said support.

6. A scale comprising a base, a horizontal lever beam pivoted centrally on said base, platform supports pivotally secured to the free ends of said lever, platforms on said supports, a check bar having its center pivoted to said base and having its ends pivoted to the lower ends of said supports, a weight indicator pivotally mounted on said base and operatively connected to said supports, said pivotal mounting being below the horizontal plane of said platforms and adjacent to the center of said beam, said indicator having one end of a control arm pivoted thereto, the other end of said arm being pivoted to said check bar adjacent an end thereof, said arm extending diagonally downward and outward from said indicator to said bar, a counter-weight on said indicator to balance the weight of said control arm, a flat spring centrally secured to said base below each of said supports, the ends of each said spring being looped and being secured to its support, each spring providing a pair of loops on opposite sides of its support to exert balanced pressure on said support.

7. A scale comprising a base, a horizontal lever beam pivoted centrally on said base, platform supports pivotally secured to the free ends of said lever, platforms on said supports, a check bar having its center pivoted to said base and having its ends pivoted to the lower ends of said supports, a weight indicator pivotally mounted on said base and operatively connected to said supports, said pivotal mounting being below the horizontal plane of said platforms and adjacent to the center of said beam, said indicator having one end of a control arm pivoted thereto, the other end of said arm being pivoted to said check bar adjacent an end thereof, said arm extending diagonally downward and outward from said indicator to said bar, a flat spring centrally secured to said base below each of said supports, the ends of each said spring being looped and being secured to its support, each spring providing a pair of loops on opposite sides of its support to exert balanced pressure on said support.

8. A scale comprising a base, a horizontal lever beam pivoted centrally on said base, platform supports pivotally secured to the free ends of said lever, platforms on said supports, a check bar having its center pivoted to said base and having its ends pivoted to the lower ends of said supports, a lateral extension on one end of said bar, a weight indicator pivotally mounted on said base and operatively connected to said supports, said pivotal mounting being below the horizontal plane of said platforms and adjacent to the center of said beam, said indicator having one end of a control arm pivoted thereto, the other end of said arm being pivoted to said check bar adjacent an end thereof, said arm extending diagonally downward and outward from said indicator to said bar, a flat spring centrally secured to said base below each of said supports, the ends of each said spring being looped and being secured to its support, said control arm composed of two bars joined at their ends and spaced apart intermediate their ends and passing around said lever, the free end extending into the space defined by said pair of loops and pivoted on said lateral extension, each spring providing a pair of loops on opposite sides of its support to exert balanced pressure on said support.

ADOLPH GOODMAN.